March 24, 1936.　　　　E. E. HEWITT　　　　2,035,067
FLUID PRESSURE BRAKE
Filed May 3, 1933　　　4 Sheets-Sheet 1
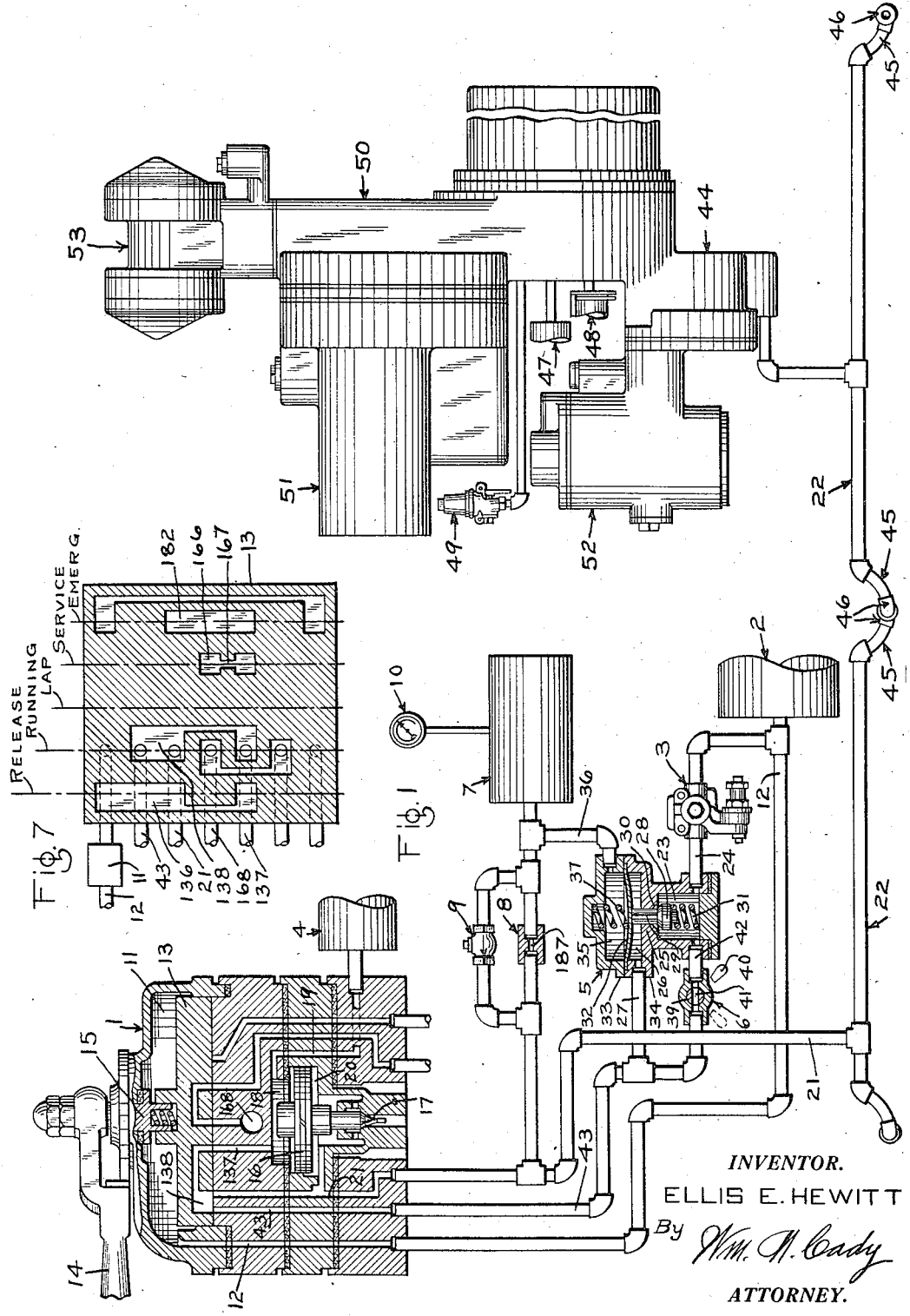
INVENTOR.
ELLIS E. HEWITT
By Wm. N. Cady
ATTORNEY.

March 24, 1936.  E. E. HEWITT  2,035,067
FLUID PRESSURE BRAKE
Filed May 3, 1933  4 Sheets-Sheet 2
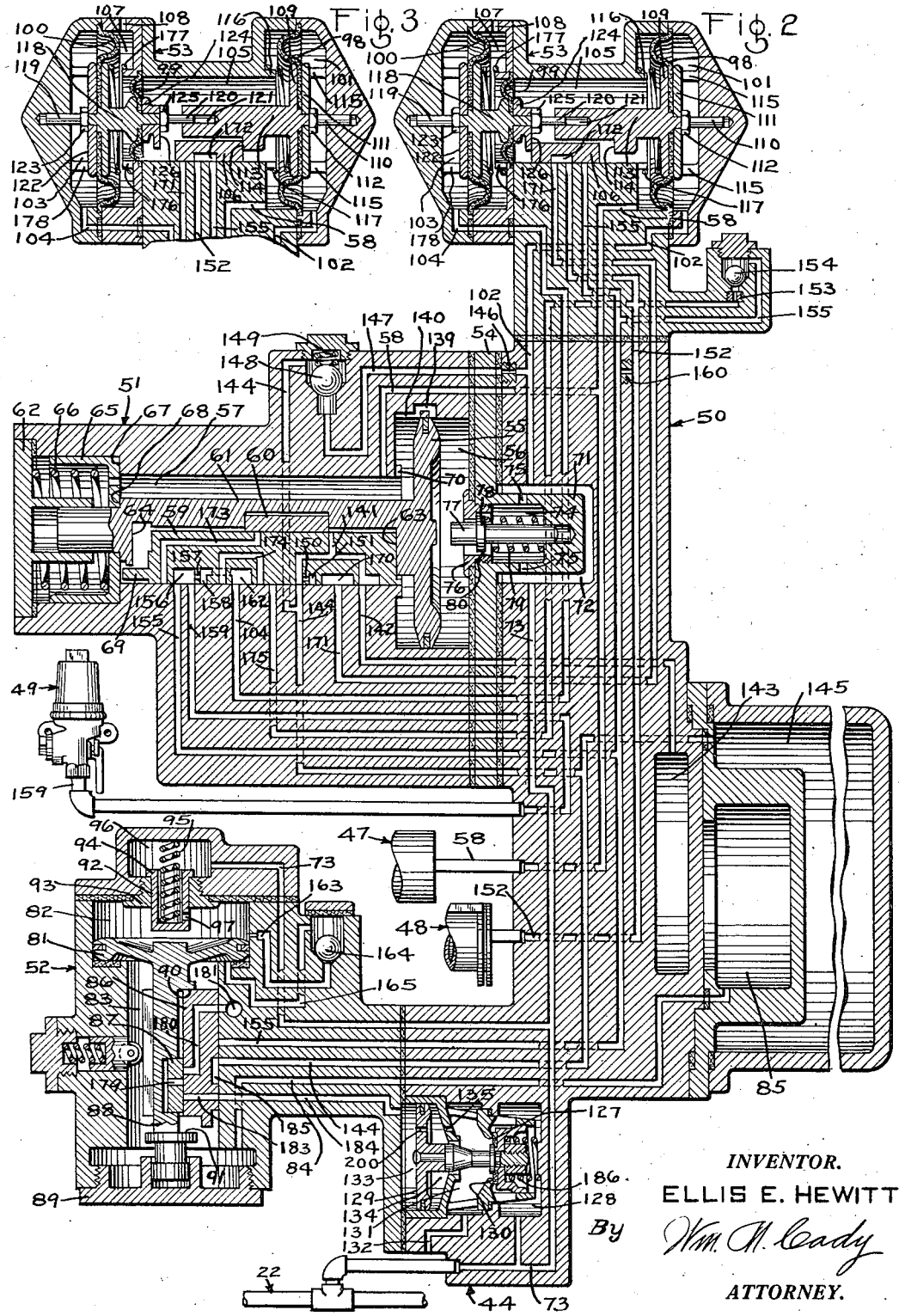
INVENTOR.
ELLIS E. HEWITT
By Wm. H. Cady
ATTORNEY.

March 24, 1936. E. E. HEWITT 2,035,067
FLUID PRESSURE BRAKE
Filed May 3, 1933 4 Sheets-Sheet 3
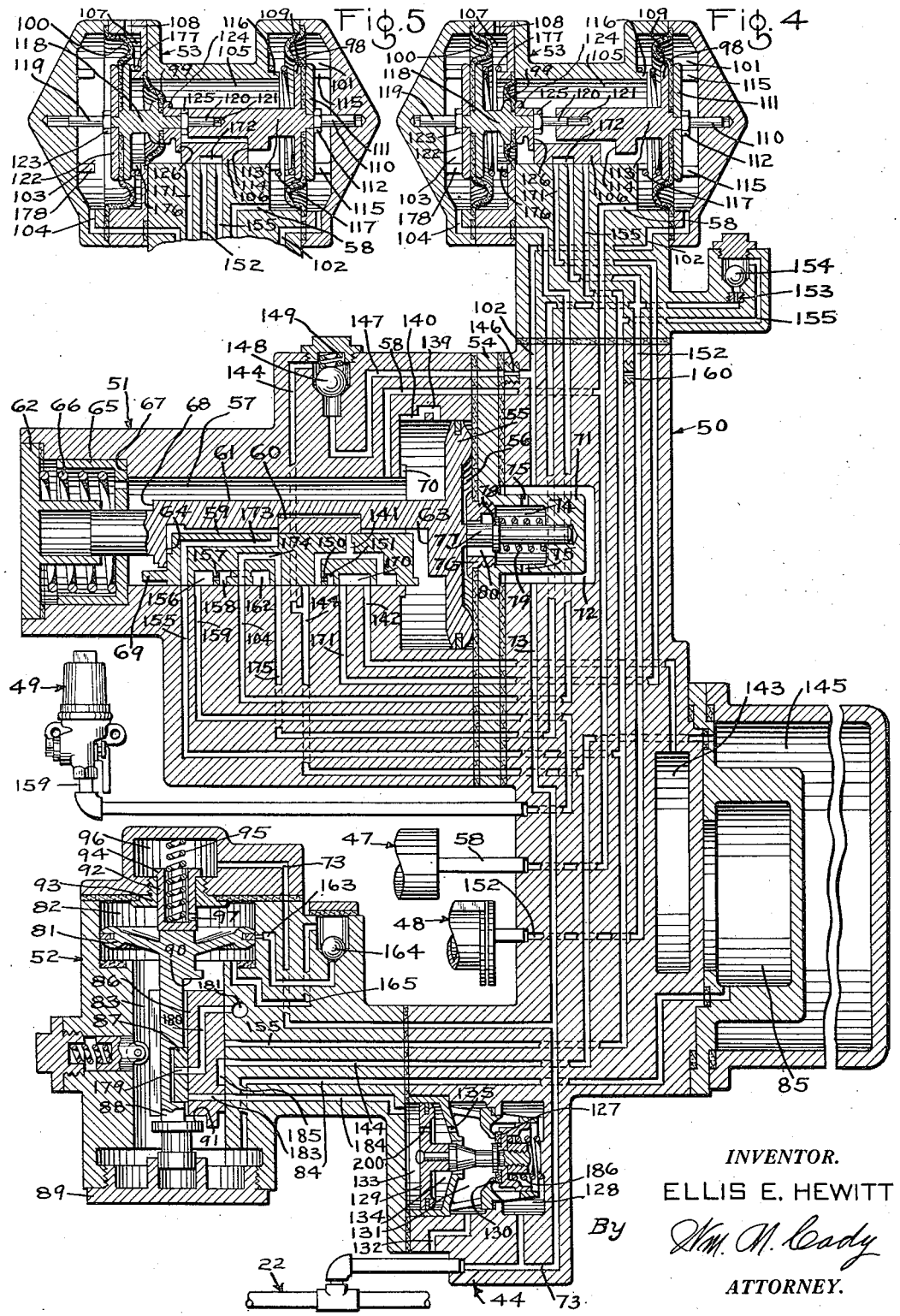
INVENTOR.
ELLIS E. HEWITT
By Wm. M. Cady
ATTORNEY.

March 24, 1936.  E. E. HEWITT  2,035,067
FLUID PRESSURE BRAKE
Filed May 3, 1933    4 Sheets-Sheet 4
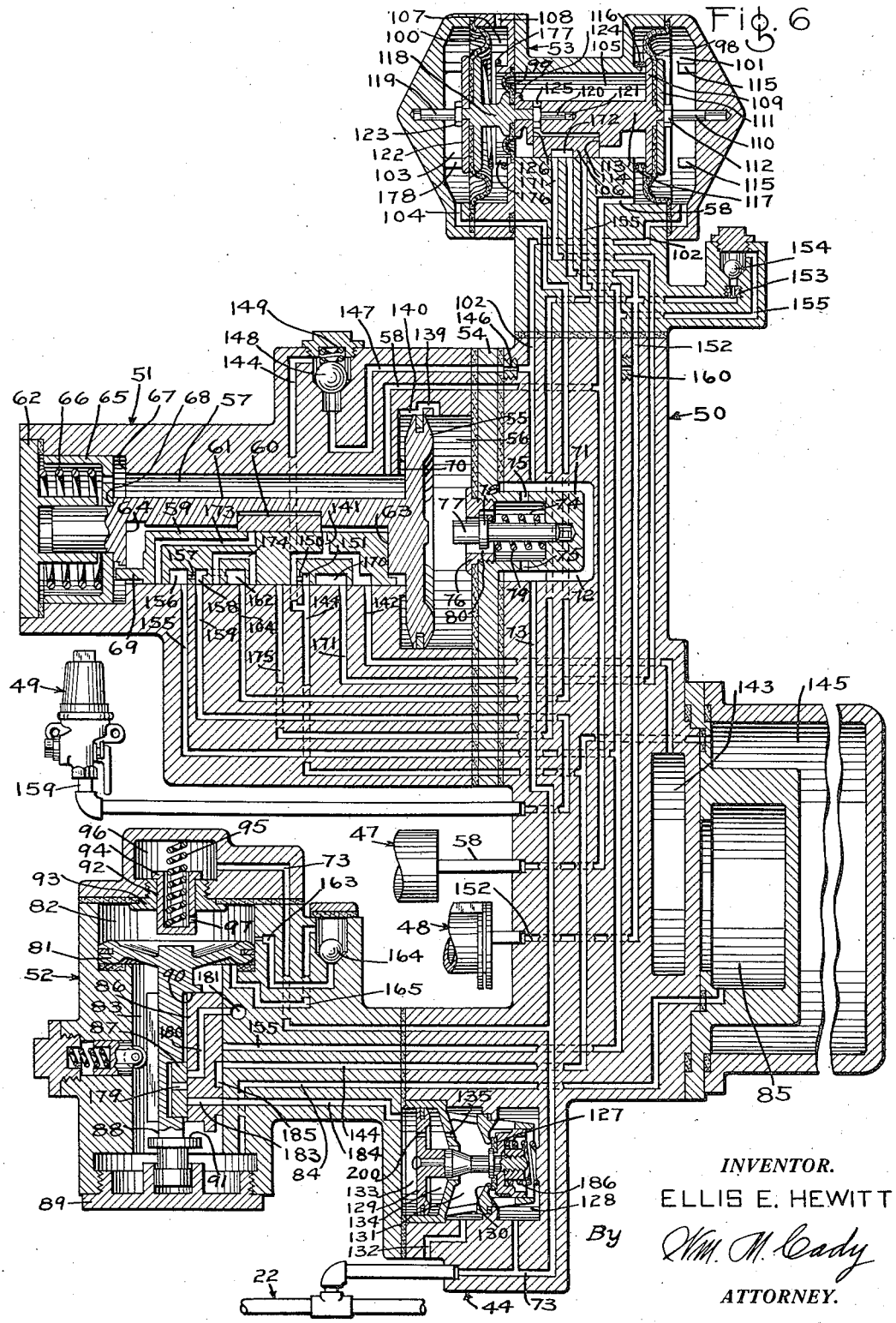
INVENTOR.
ELLIS E. HEWITT
By Wm. M. Cady
ATTORNEY.

Patented Mar. 24, 1936

2,035,067

UNITED STATES PATENT OFFICE 2,035,067

FLUID PRESSURE BRAKE

Ellis E. Hewitt, Edgewood, Pa., assignor to The Westinghouse Air Brake Company, Wilmerding, Pa., a corporation of Pennsylvania Application May 3, 1933, Serial No. 669,183

22 Claims. (Cl. 303—46)

This invention relates to fluid pressure brakes of the type in which the brakes are applied upon a reduction in brake pipe pressure and are released upon an increase in brake pipe pressure.

It has heretofore been proposed to provide a fluid pressure brake equipment for cars, which operates, in effecting an application of the brakes, to delay the application at the front of the train so as to permit the slack in the train to run in and be gathered without developing excessive and damaging shocks, and one object of my invention is to provide an improved fluid pressure brake equipment for accomplishing this result.

In effecting a release of the brakes, the usual practice is for the engineer to first move the brake valve device to release position, in which fluid from the main reservoir is supplied to the brake pipe so as to secure a prompt release of the brakes throughout the train, and then the engineer moves the brake valve device to running position, in which fluid is supplied by a feed valve device to the brake pipe at the pressure normally carried in the brake pipe. The above mentioned object is accomplished by utilizing the high pressure thus initially obtained in the brake pipe in releasing the brakes to condition my improved fluid pressure brake equipment at the head end of the train, so that the equipment will operate to delay the application of brakes at the head end of the train when the brakes are applied by effecting a reduction in brake pipe pressure and thus prevent the slack from running in at such a rate as to cause excessive and damaging shocks.

In some cases, such as in the operation of short trains or trains in high speed service, it may not be necessary to delay the application of the brakes on cars at the head end of the train, since in such cases the running in of the slack does not cause excessive shocks, and another object of my invention is to provide improved means whereby, when desired, the delay of the brake application on cars at the head end of the train may be prevented.

According to the last mentioned object, in order to prevent the apparatus from being conditioned to delay the application of brakes on cars at the head end of the train, the brake valve device is turned to running position in releasing the brakes instead of to release position, but since I have found that even the rate of flow from the usual feed valve device may at times be sufficient to cause the brake equipment on cars at the head end of the train to be set for delaying the application of the brakes, I have provided means on the locomotive for ensuring that the rate of increase in brake pipe pressure will not be such as to cause the brake equipment on the head cars to be set for effecting a delayed application of the brakes when the brake valve device is initially turned to running position instead of release position in releasing the brakes.

Other objects and advantages will appear in the following more detailed description of the invention.

In the accompanying drawings, Fig. 1 is a diagrammatic view, partly in section, of a brake equipment for the locomotive and a car of a train and embodying the invention; Fig. 2 is a diagrammatic view of the car brake equipment shown in Fig. 1, and with the parts shown in the positions assumed, when the rate of increase in brake pipe pressure is high, at the front end of a train when the brakes are released; Fig. 3 is a diagrammatic view of the delay valve portion of the brake equipment shown in Fig. 2, and with the parts shown in the positions assumed at the rear end of a train when the brakes are released; Fig. 4 is a diagrammatic view similar to Fig. 2, but with the parts shown in the positions initially assumed at the front end of a train in effecting an application of the brakes when the apparatus is set to delay the application of the brakes; Fig. 5 is a diagrammatic view of the delay valve position of the brake equipment shown in Fig. 4, with the parts shown in the position finally assumed at the front end of a train in effecting an application of the brakes when the apparatus is conditioned to delay the application of the brakes; Fig. 6 is a diagrammatic view similar to Fig. 2, but with the parts shown in the position initially assumed at the front end of a train, due to the rapid rate of increase in brake pipe pressure, in effecting a release of the brakes; and Fig. 7 is a diagrammatic development view of the brake valve device shown in Fig. 1.

As shown in Fig. 1 of the drawings, the locomotive brake equipment comprises the usual engineer's brake valve device 1, main reservoir 2, feed valve device 3 and equalizing reservoir 4, and further comprises, according to the invention, a brake pipe charging control valve device 5, a cut-out cock 6, a control reservoir 7, a choke fitting 8 for restricting the flow of fluid under pressure to said control reservoir 7, a check valve device 9 provided in a by-pass communication around the choke fitting 8 to permit unrestricted flow of fluid under pressure from said reservoir, and a pressure gauge 10 connected to reservoir 7 for indicating the pressure of fluid therein.

The engineer's brake valve device 1 comprises a casing having a chamber 11 connected through passage and pipe 12 to the main reservoir 2 and containing a rotary valve 13 adapted to be turned to various controlling positions by means of a handle 14 through the medium of a drive shaft 15 operatively connecting said handle to said rotary valve. The brake valve device 1 further includes the usual brake pipe discharge valve mechanism comprising an equalizing piston 16 and a brake pipe discharge valve 17 operatively connected to said piston. The equalizing piston 16 is open at one side to a chamber 18 communicating through passage 19 with the equalizing reservoir 4, and is open at the opposite side to a chamber 20 communicating through passage and pipe 21 with the usual brake pipe 22.

The feed valve device 3 is of the usual type and adapted to supply fluid under pressure from the main reservoir 2 to the brake pipe 22 and to reduce the pressure of said fluid from that carried in the main reservoir to that normally carried in said brake pipe.

The brake pipe charging control valve device 5 comprises a casing having a chamber 23 connected through pipe 24 with the feed valve device 3 and separated by a partition wall 25 from a chamber 26 connected to a pipe 27. A supply valve 28, contained in chamber 23, is provided with a fluted stem 29 slidably extending through a suitable bore in partition wall 25, which is provided with a seat 30 adapted to be engaged by said supply valve. A spring 31 is provided in chamber 23 to urge supply valve 28 into engagement with seat 30.

A flexible diaphragm 32 is clamped between sections 33 and 34 of the control valve device casing and has at one side chamber 26 and at the opposite side a chamber 35 communicating through pipe 36 with the control reservoir 7. A spring 37, contained in chamber 35, acts on one side of the flexible diaphragm 32 and urges said diaphragm into engagement with the supply valve stem 29 which projects into chamber 26.

The cut-out cock 6 may be of the usual type comprising a casing having a bore containing a rotary plug valve 39 adapted to be turned by a handle 40. The plug valve 39 is provided with a through port 41, adapted when positioned for long train operation, as shown in Fig. 1, to establish a direct communication from the feed valve device 3 to the brake valve device 1 through pipe 24, chamber 23 in the control valve device 5, pipe 42, port 41 and pipe 43. For short train operation, the handle 40 is turned to the position indicated in dotted lines, and the consequent rotation of plug valve 39 closes communication from pipe 42 to pipe 43.

The fluid pressure brake equipment for the car of the train comprises a brake controlling valve device 44 connected to the brake pipe 22 on the car, said brake pipe being connected by the usual flexible hose 45 and couplings 46 to brake pipe 22 on the locomotive. The car equipment further comprises an auxiliary reservoir 47, a brake cylinder 48 and a pressure retaining valve 49.

The brake controlling valve device 44 comprises a pipe bracket 50, upon which is removably mounted a service application valve device 51, an emergency application valve device 52, and a delay valve device 53 for regulating the rate at which fluid under pressure is supplied to the brake cylinder in effecting an application of the brakes.

The service application valve device 51 comprises a casing and a filler member 54 interposed between said casing and the pipe bracket 50, said casing containing a piston 55, having at one side a chamber 56 connected through passage 73 to brake pipe 22 and having at the opposite side a valve chamber 57 connected through passage and pipe 58 to the auxiliary reservoir 47, said valve chamber containing a main slide valve 59 and an auxiliary slide valve 60.

The piston 55 is provided with a stem 61, the end of which is guidably mounted in a suitable bore in a removable cover member 62 which closes the outer end of valve chamber 57. The stem 61 is provided with the usual recess containing the auxiliary slide valve 60 and is also provided with the usual spaced shoulders 63 and 64 adapted to engage the ends of the main slide valve 59 for moving said main slide valve.

A movable abutment 65 is slidably mounted in an outer enlarged portion of valve chamber 57 and a spring 66 acting on said abutment urges said abutment towards a shoulder 67 provided in the casing.

The abutment 65 is provided centrally with an aperture through which the rear end of the piston stem 61 slidably projects, said stem having a shoulder 68 adapted to engage said abutment. The main slide valve 59 is provided with a rearwardly extending finger 69 also adapted to engage the abutment 65 at substantially the same time as shoulder 68 on the piston stem 61 engages said abutment, said abutment when engaging shoulder 67 in the casing, defining the full release position of piston 55 and slide valves 59 and 60 and being adapted to resiliently oppose movement of said parts to the inner or retarded release position defined by engagement of the piston 55 with an annular stop rib 70 provided in the casing.

The filler member 54 is provided with a boss 71 projecting into a chamber 72 in the pipe bracket 50, which chamber is at all times in communication with the brake pipe 22 through a passage 73. The boss 71 is provided with a chamber 74 open to chamber 72 through a plurality of openings 75. A cap member 76 is secured to the filler member 54 in the open end of chamber 74 by screw-threaded engagement. The cap member 76 is provided centrally with an opening through which one end of a plunger 77 slidably extends, the other end of said plunger being slidably supported in a suitable bore in boss 71. The plunger 77 is provided with an annular collar 78 of greater diameter than that of the opening through the cap member 76, and a spring 79 is interposed between said collar and the boss 71 at the bottom of chamber 74 and urges said plunger to the position in which the collar 78 engages the cap member. A suitable opening 80 is provided through the cap member 76 to maintain communication from the piston chamber 56 to chamber 74 which is at all times in communication with brake pipe 22, as hereinbefore described.

The emergency application valve device 52 comprises a casing containing a piston 81 having at one side a chamber 82 open to the brake pipe 22 and having at the opposite side a valve chamber 83 communicating through a passage 84 with a quick action chamber 85, which is formed in a casing section, secured to the pipe bracket 50, said valve chamber containing a main slide valve 86 and an auxiliary slide valve 87 adapted to be operated by the piston 81. For moving the slide valves 86 and 87, the piston 81 is provided with a stem 88, the outer end of which is slidably mounted in a suitable bore in a cover member 89 which closes the lower end of valve chamber 83, said stem being provided with a recess for the reception of the auxiliary slide valve 87, and two spaced shoulders 90 and 91 adapted to engage the main slide valve for moving said slide valve.

A plunger 92 is slidably mounted in a suitable bore in a member 93 having screw-threaded engagement in the casing of the emergency valve device, said plunger extending into the piston chamber 82. An annular rib 94 on the plunger 92 is adapted to engage member 93 to limit the movement of said plunger into piston chamber 82, and a spring 95 contained in a chamber 96 and acting on said plunger is provided to oppose movement of said plunger into chamber 96. Chamber 96 is at all times open to brake pipe 22 through passage 73, and is open to the emergency piston chamber 82 through a passage 97 provided in the bottom of the plunger 94.

The delay valve device 53 comprises a casing containing three spaced flexible diaphragms 98, 99, and 100, and a slide valve 106 adapted to be controlled by the operation of said diaphragm. The diaphragm 98 has at one side a chamber 101 connected to the brake pipe 22 by way of passage 102 and chamber 72, and the diaphragm 100 has at the opposite side a chamber 103 connected to a passage 104 leading to the seat of slide valve 56 in the service application valve device 51. A valve chamber 105, containing the slide valve 106, is provided between the diaphragms 98 and 99 and is in constant communication with the auxiliary reservoir 47 through passage and pipe 58, while an atmospheric chamber 107 is provided between the diaphragms 99 and 100 and is open to the atmosphere through an atmospheric passage 108.

A follower plate 109, contained in valve chamber 105, is mounted at one side of the flexible diaphragm 98 and is provided with a stem 110 which extends through a suitable aperture in said diaphragm and into a suitable bore in the casing, wherein said stem has sliding engagement with the casing. A follower plate 111, contained in chamber 101, is mounted on the stem 110, and a nut 112, having screw-threaded engagement on said stem, is provided to clamp the follower plates 109 and 111 to the diaphragm 98.

The diaphragm follower 109 is provided with a valve operating stem 113, having a shoulder 114 adapted to engage the right hand end of slide valve 106 for moving said slide valve toward the left hand, as will hereinafter be described. A plurality of lugs 115, provided on the casing, are so positioned as to limit deflection of diaphragm 98 toward the right hand, and a seat rib 116 is provided on the casing to limit deflection of said diaphragm in the opposite direction. A spring 117, having one end surrounding rib 116, engages the follower 109 and urges the diaphragm 98 towards its right hand position.

A combined follower and spacer member 118 is interposed between the flexible diaphragms 99 and 100. Said spacer member is provided on one end with a stem 119 extending through a suitable aperture in diaphragm 100 and slidably projecting into a suitable bore in the casing, and is provided on the opposite end with a similar stem 120 slidably projecting into an axial bore 121 provided in the stem 113. A follower plate 122 is mounted on the stem 119 and a nut 123, having screw-threaded engagement with said stem, is provided to clamp the diaphragm 100 between the follower plate 122 and spacer 118. A follower 124 is mounted on the stem 120 and a nut 125, having screw-threaded engagement with the stem 120, is provided to clamp the diaphragm 99 between said follower and the spacer 118. The follower 124 is provided with a depending lug having a shoulder 126 adapted to engage slide valve 106 for moving said slide valve towards the right hand, as will be hereinafter described. A stop rib 176 is provided in the casing and is adapted to be engaged by spacer member 118 for limiting the deflection of diaphragm 100 in a direction toward the right hand, and a plurality of stop lugs 178 are provided to be engaged by follower 122 for limiting deflection of said diaphragm in the opposite direction.

A brake pipe vent valve mechanism of the usual type is mounted in the pipe bracket 50 and comprises a vent valve 127 contained in a chamber 128 which is open to brake pipe 22 through passage 73, and a piston 129 operatively connected to said vent valve for moving same away from a seat rib 130, so as to connect chamber 128 to chamber 131 which is open to the atmosphere through an atmospheric passage 132. The piston 129 has at one side an actuating chamber 133 and at the opposite side a chamber 134 open to the atmospheric chamber 131 through a port 135.

The retaining valve device 49 may be of the usual type having a cut-in position and a cut-out position. In the cut-in position, the retaining valve device is adapted in the usual manner, to retain a predetermined fluid pressure in the brake cylinder 48 when the brake pipe pressure is increased to recharge the brake equipment, while in cut-out position, the retaining valve device permits complete release of fluid under pressure from the brake cylinder.

If it is desired to retard the build up of brake cylinder pressure on cars at the head end of the train, as in operating a long train, the cut-out cock 6 on the locomotive is turned to the open position, as shown in Fig. 1, in which position direct communication is established from the feed valve device 3 to pipe 43 leading to the automatic brake valve device 1.

In operation, the main reservoir 2 on the locomotive is supplied with fluid under pressure in the usual manner and fluid under pressure from said main reservoir flows through pipe 12 to the feed valve device 3 and to rotary valve chamber 11 in the brake valve device 1, the brake valve device being operative in the usual manner to control the supply of fluid under pressure to the brake pipe 22 for charging the brake equipments on the cars of the train.

In order to effect the prompt release of the brakes, it is customary for the engineer to initially turn the brake valve device 1 to release position, and then after a certain lapse of time he turns the brake valve device to running position.

In release position of the brake valve device 1, a cavity 136 in rotary valve 13 establishes a communication from rotary valve chamber 11 to the brake pipe passage 21 and to a passage 137 leading to the equalizing piston chamber 18, so that fluid under pressure supplied from the main reservoir to the rotary valve chamber 11 is permitted to flow through passage 21 to the equalizing piston chamber 20 and to the brake pipe 22 and also through passage 137 to the equalizing piston chamber 18 and from thence through passage and pipe 19 to the equalizing reservoir 4. Since the chambers at the opposite sides of the equalizing piston 16 are thus charged at substantially the same time and with substantially the same degree of pressure, said piston operates to hold the discharge valve 17 seated in the usual well known manner.

By supplying fluid at the high pressure in the main reservoir 2 directly to the brake pipe, with the brake valve device in release position, the brake pipe pressure is rapidly increased to cause a prompt release of the brakes, and at the head of the train the pressure in the brake pipe generally increases to a degree above that normally carried; but before the auxiliary reservoirs on cars at the head of the train become charged to a pressure exceeding that normally carried, the brake valve device 1 should be turned to running position, in which position communication from the main reservoir 2 to brake pipe 22 and equalizing reservoir 4 is closed, and said brake pipe and reservoir are connected through a cavity 138 in the rotary valve 13 to passage 43, which passage is supplied with fluid at reduced pressure from the feed valve device 3, the cut-out cock 6 being in open position. Fluid at the reduced pressure supplied by the feed valve device thus flows to the brake pipe and equalizing reservoir 4 until the pressure in said brake pipe and reservoir is increased to that which it is desired to carry, as governed by the adjustment of said feed valve device.

In the train, fluid under pressure supplied to brake pipe 22 flows to the brake controlling valve device 44 on the cars, and from thence through passage 73 in said device to the emergency piston chamber 82, and also to chamber 72 which is at all times open to the piston chamber 56 of the service application valve device 51. From chamber 72, fluid under pressure flows through passage 102 to diaphragm chamber 101 of the delay valve device 53.

At the head of the train, the initial rapid increase in pressure in the brake pipe and consequently in piston chamber 56 of the service application valve device 51, exceeds the rate at which fluid under pressure can flow from said chamber through the usual charging passage 139 to valve chamber 57, so that a differential of pressure is obtained on piston 55 which moves said piston and the slide valves 59 and 60 to the inner release position, as shown in Fig. 6, this movement from the normal release position to the inner release position being opposed by the pressure of the spring 66 on the movable abutment 65, in the well known manner.

In the inner release position of the service application valve device, fluid under pressure supplied from the brake pipe to piston chamber 56 flows through the usual charging passage 139 and then through a more restricted charging passage 140 to valve chamber 57 and from thence through passage 58 to the auxiliary reservoir 47 and diaphragm chamber 105 of the delay valve device 53. Fluid under pressure also flows from valve chamber 57 through a restricted port 141 in the main slide valve 59 to a passage 142 and from thence to an inshot reservoir 143, and also from port 141 through a restricted port 150 and a cavity 151 to a passage 144 and from thence to an emergency reservoir 145, the passage 144 also leading to the seat of the emergency slide valve 86 which normally laps said passage.

Fluid under pressure is also supplied directly from the brake pipe 22 to the emergency reservoir 145 by way of passage 73, chamber 72, passage 102, choke plug 146, passage 147, and past a check valve 148, which is subject to the pressure of a spring 149, to passage 144 leading to the emergency reservoir 145.

In the inner position of the service slide valve 59, the brake cylinder 48 is open to the atmosphere through pipe and passage 152, a release choke plug 153, past a check valve 154, through passage 155, cavity 156 in said slide valve, the usual retarded release choke 157, cavity 158, passage and pipe 159, and from thence through the retaining valve device 49 which, unless otherwise specified, will be considered to be in the cut-out or non-retaining position. Incidentally, the brake cylinder 48 is also open to the atmosphere through passage 152, and a delayed application choke plug 160 which opens to passage 155 leading to the release cavity 156 in slide valve 59 of the service application valve device 51.

When the pressure in the auxiliary reservoir 47 and valve chamber 57 has been increased to a degree substantially within the value of the inner release spring 66 of the brake pipe pressure acting in piston chamber 56, said spring acts to shift the abutment 65 and thereby the piston 55 and slide valves 59 and 60 to the normal release position, as indicated in Fig. 2.

In the normal release position, fluid continues to flow from piston chamber 56 through the charging passage 139 to valve chamber 57 until the pressures in said chambers equalize. The emergency reservoir passage 144 is opened directly to port 141 in the main slide valve 59 and equalization of pressures in the auxiliary reservoir 47, emergency reservoir 145 and inshot reservoir 143 occurs, and the brake cylinder passage 155 is opened directly through cavity 156 to the brake cylinder release passage 159.

In the rear portion of the train, where the rate of increase in brake pipe pressure is relatively slow, the flow capacity of feed passage 139 around the service piston 55 permits flow of fluid from piston chamber 56 to valve chamber 59 and the auxiliary reservoir 47 at such a rate, with respect to the rate of increase in brake pipe pressure, as to prevent obtaining a sufficient differential of pressures on piston 55 to operate said piston to compress spring 66 as at the head of the train. Therefore, the piston 55 and slide valves 59 and 60 remain in the normal release position, in which position communications are established, as hereinbefore described, through which the auxiliary reservoir 47, emergency reservoir 145 and inshot reservoir 143 are charged with fluid under pressure from the brake pipe, and in which the brake cylinder 48 is opened to the atmosphere.

When the service slide valve 59 is in both the normal and inner release positions, the diaphragm chamber 103 of the delay valve device 53 is connected through passage 104 and cavity 162 in said slide valve to the retarded release cavity 158 and thence through choke 157 to cavity 156 which connects the brake cylinder passage 155 to the atmospheric passage 159, so that in initially charging the train, the pressure acting in diaphragm chamber 103 will be atmospheric pressure, the same as in the brake cylinder.

In initially charging the train as above described, it will be noted that in the delay valve device 53, diaphragm chamber 103 is open to the atmosphere with the brake cylinder 48, diaphragm chamber 105 is open to the auxiliary reservoir 47 and diaphragm chamber 101 is open to brake pipe 22. At the head end of the train, the rapid rate of increase in brake pipe pressure in chamber 101 deflects diaphragm 98 into engagement with seat rib 116 against the opposing pressures of the auxiliary reservoir in diaphragm chamber 105 and spring 117 and thereby positions the slide valve 106 in the delayed application position, as shown in Figs. 2, 4, and 6. Then when the auxiliary reservoir pressure in diaphragm chamber 105 is increased to within a predetermined degree of brake pipe pressure acting in chamber 101, said degree being governed by the pressure of spring 117, said spring returns the diaphragm 98 to its normal position, as shown in Fig. 2. This return movement of diaphragm 98 and consequently of stem 113 is relative to slide valve 106, so that said slide valve remains in the delayed application position, as shown in Fig. 2.

In the rear portion of the train, the pressure of spring 117 prevents deflection of diaphragm 98 towards the left hand, as above described, since in the rear portion of the train the auxiliary reservoir pressure in chamber 105 increases at substantially the same rate as brake pipe pressure in chamber 101. It will, therefore, be evident that in the rear portion of the train, the slide valve 106 will remain in whatever position it occupied upon making up the train, i. e., the slide valve 106 may be in either the delayed application position, as shown in Fig. 2, or the direct buildup position, as shown in Fig. 3. At the rear of the train, the slide valve 106 should be in the direct build up position for properly controlling an application of the brakes, and in order to thus position said slide valve, it is necessary, after initially charging the train, to first effect a service application of the brakes and then a release of the brakes, as will hereinafter be described, said application and release of brakes constituting the usual yard test before releasing a train for service.

With the emergency piston 81 in the normal position, as shown in Figs. 2 and 6, fluid under pressure supplied from the brake pipe 22 to piston chamber 82, on cars at both the front and rear of the train, equalizes through passage 163, past a check valve 164, and through passage 165 into the emergency slide valve chamber 83 and from thence through passage 84 into the quick action chamber 85.

After the train is initially charged, as above described, the usual yard test is made to test the brake equipment on the train for operation and to automatically adjust each delay valve device 53 according to its location in the train.

As hereinbefore mentioned, the usual yard test consists in first effecting a service application of the brakes on the train, and then a release of the brakes, but since these operations will be hereinafter described in detail, it is deemed sufficient to limit the present description of yard test to the adjusting of the delay valve device 53.

In making the yard test, a gradual reduction in pressure in brake pipe 22 is effected by operation of the brake valve device 1 on the locomotive, and the resultant reduction in pressure in piston chamber 56 of the service application valve device 51 permits auxiliary reservoir pressure in valve chamber 57 to move the piston 55 and slide valves 59 and 60 to service application position, as shown in Fig. 4.

In service application position of the slide valves 59 and 60, fluid under pressure is permitted to flow from valve chamber 57 and the connected auxiliary reservoir 47 through the usual service port 173 to passage 155 leading to the seat of delay valve slide valve 106. If the delay valve slide valve 106 is in the direct build up position shown in Figs. 3 and 5, fluid under pressure flows from passage 155 through cavity 172 in said slide valve to passage 152 and from thence to the brake cylinder 48, thereby applying the brakes. If, however, the slide valve 106 is in the delayed application position shown in Figs. 2 and 4, passage 155, to which fluid under pressure is supplied by operation of the service application valve device, is lapped, so that flow from said passage to passage 152 leading to the brake cylinder 48 occurs through the choke 160. The brake cylinder 48 is connected through passages 152 and 175 to the seat of slide valve 59, and thence through a cavity 174 in said slide valve to passage 104 leading to diaphragm chamber 103 of the delay valve device, so that fluid at brake cylinder pressure acts in said chamber on the diaphragm 100. When the pressure in the brake cylinder and chamber 103 acting on diaphragm 100 is increased to a certain predetermined degree with respect to the opposing and reducing auxiliary reservoir pressure in chamber 105 acting on diaphragm 99, the diaphragm 100 is deflected towards the right hand into engagement with the stop 176. This deflection of diaphragm 100 shifts the slide valve 106 from the delayed application position, as shown in Fig. 4, to the direct build up position, as shown in Fig. 5, and in the direct build up position, the further supply of fluid under pressure to the brake cylinder occurs through cavity 172 in said slide valve. It will now be noted, that if the slide valve 106 is in direct build up position, its position does not change in effecting an application of the brakes, but if it is in delayed application position, it is shifted to direct build up position, so that at the end of the application each slide valve 106 in the train is in the direct build up position.

In effecting a release of brakes after an application, the brake pipe pressure is increased by the operation of brake valve device 1 on the locomotive, and the consequent increase in pressure in piston chamber 56 of the service application valve device 51 operates said device to recharge the auxiliary reservoir 47 and to open communication from the brake cylinder 48 to the atmosphere, through which fluid under pressure is released from the brake cylinder to effect a release of the brakes.

In the front portion of the train, the rapid increase in brake pipe pressure in diaphragm chamber 101 of the delay valve device deflects diaphragm 98 to its left hand position, thereby moving the slide valve 106 to the delayed application position. In the rear portion of the train, spring 117 holds the diaphragm 98 in its normal position, as shown in Fig. 2, due to the fact that auxiliary reservoir pressure in diaphragm chamber 105 increases at substantially the same rate as brake pipe pressure increases in diaphragm chamber 101, and it will, therefore, be evident that in the rear portion of the train, slide valve 106 remains in the direct build up position.

It will be noted, that after effecting a release of the brakes, each delay valve slide valve 106 in the front portion of the train, is in the delayed application position shown in Fig. 2, while in the rear portion of the train, said slide valve is in the direct build up position shown in Fig. 3, and the train is now in condition for service operation.

If it is desired to effect a service application of the brakes, the brake valve device 1 is turned to service position, in which the brake pipe passage 21 is lapped by the rotary valve 13, and fluid under pressure is vented from the equalizing piston chamber 18 and connected equalizing reservoir 4 through passage 137, cavity 166 in the rotary valve 13, said cavity having a restricted portion 167, and from thence to the atmosphere through the usual atmospheric passage 168.

When the equalizing reservoir pressure in chamber 18 is thus reduced below brake pipe pressure acting in chamber 20 at the opposite side of the equalizing piston 16, said piston is operated to lift the discharge valve 17 away from its seat in the usual manner, so as to vent fluid under pressure from the brake pipe 22 through pipe and passage 21, equalizing piston chamber 20 and from thence past the discharge valve 17 to the atmosphere.

The brake valve device 1 is left in service position until the pressure in the equalizing reservoir 4 is reduced to a degree corresponding to the degree of reduction which it is desired to effect in the brake pipe 22, and then said brake valve device is turned to lap position, in which passage 137 is lapped so as to prevent further reduction in pressure in said reservoir.

After moving the brake valve device to lap position, fluid under pressure continues to be vented from brake pipe 22 until said pressure acting on the lower face of the equalizing piston 16 is reduced to a degree slightly below the reduced equalizing reservoir pressure acting on the upper face of said piston, at which time the equalizing piston 16 is operated to seat the discharge valve 17 and thus prevent further reduction in brake pipe pressure.

In the train, the reduction in brake pipe pressure effected by the operation of the brake valve device on the locomotive, permits auxiliary reservoir pressure in valve chamber 57 of the service application valve device 51 to move the piston 55 and thereby the slide valves 59 and 60 out to service position, as shown in Fig. 4.

In service position of slide valve 59, a cavity 170 connects passage 142, leading to the inshot reservoir 143, to a passage 171 leading to the seat of the delay valve slide valve 106, so that fluid under pressure is permitted to flow from the inshot reservoir to the delay valve device 53, and also fluid under pressure is permitted to flow from the valve chamber 57 and connected auxiliary reservoir 47, through the service port 173 in slide valve 59, to passage 155 also leading to the seat of the slide valve 106 in the delay valve device.

In the front portion of the train where the slide valve 106 of the delay valve device is in the delayed application position, as shown in Fig. 4, passage 171 is connected through cavity 172 to passage 152 leading to the brake cylinder 48, so that fluid under pressure is permitted to rapidly equalize from the inshot reservoir 143 into the brake cylinder 48. This equalization of pressure from the inshot reservoir into the brake cylinder produces only a low pressure in the brake cylinder, the degree of which, however, is sufficient to provide a prompt predetermined movement of the usual brake cylinder piston (not shown), but it is not adapted to provide effective braking force.

With passage 155 lapped by the delay valve slide valve 106, fluid under pressure supplied to said passage by operation of the service application valve device 51, flows through the choke 160 to passage 152 and from thence to the brake cylinder 48. This restricted or slow supply of fluid under pressure from the auxiliary reservoir 47 to the brake cylinder, occurs simultaneously with the equalization of fluid under pressure from the inshot reservoir 143 into the brake cylinder and then continues after said equalization for a certain period of time, which will be hereinafter described.

In service application position of slide valve 59, fluid at the pressure acting in the brake cylinder 48 is supplied through passages 152 and 175, cavity 174 in said slide valve and passage 104 to diaphragm chamber 103 in the delay valve device. The diaphragm 100 is thus subject on one face to brake cylinder pressure and on the opposite face to atmospheric pressure in chamber 107, while the connected and smaller diaphragm 99 is subject on one face to atmospheric pressure in chamber 107 and on the opposite face to reducing auxiliary reservoir pressure in valve chamber 105. The areas of the diaphragms 99 and 100 are so proportioned to each other, that when a predetermined pressure, such as 10 pounds, is obtained in the brake cylinder by the supply from the inshot reservoir 143 and from the auxiliary reservoir 47 through the choke 160, said pressure acting on diaphragm 100 overcomes the opposing reduced auxiliary reservoir pressure in chamber 105 acting on diaphragm 99, plus the pressure of spring 177 acting on the spacer member 118 and deflects said diaphragms toward the right hand into engagement with the stop rib 176, as shown in Fig. 5. This deflection of diaphragms 99 and 100 acts through shoulder 126 on the follower 124 to shift the slide valve 106 from the delayed application position, as shown in Fig. 4, to the direct build up position, as shown in Fig. 5. In the direct build up position of slide valve 106, cavity 172 in said slide valve connects passage 155 to the brake cylinder passage 152, thereby establishing a by-pass around the delayed application choke plug 160, through which by-pass, fluid under pressure supplied to the passage 155 by operation of the service application valve device 51 flows to the brake cylinder at a faster rate than through the choke plug 160. Passage 171, through which fluid under pressure was supplied from the inshot reservoir 143 when the slide valve 106 was in the delayed application position, is lapped by said slide valve in direct build up position, so as to prevent back flow of fluid under pressure from the brake cylinder to the inshot reservoir when the brake cylinder pressure exceeds the reduced pressure in the inshot reservoir.

In the rear portion of the train, where the delay valve slide valve 106 is in the direct build up position, it will be evident that the entire supply of fluid under pressure from the auxiliary reservoir to the brake cylinder will be effected through the above described by-pass around the restricted choke plug 160, i. e., by way of passage 155, cavity 172 in slide valve 106 and passage 152, and it will be further evident, that since passage 171, to which fluid under pressure is supplied from the inshot reservoir 143 by way of the service application valve device 51, is lapped, there will be no flow of fluid under pressure from the inshot reservoir 143 to the brake cylinder. In the rear portion of the train, the diaphragms 100 and 99 are deflected to their right hand position, as shown in Fig. 5, the same as in the front portion of the train, but since in the rear portion of the train, the slide valve 106 is normally in its right hand or direct build up position, it will be evident that such deflection of diaphragms 100 and 99 performs no useful function in the rear portion of the train.

It will now be noted, that in effecting a service application of the brakes, the brakes in the front portion of the train are applied in three different stages, there being the initial rapid, but limited inshot of fluid under pressure from the inshot reservoir 143 to the brake cylinder 48, which is merely adapted to provide a predetermined movement of the brake cylinder piston (not shown), but is not adapted to provide effective braking force. The initial inshot of fluid under pressure to the brake cylinder is followed by the slow build up through the choke plug 160, which build up is adapted to apply the brakes at a relatively slow rate for causing the slack in the train to gradually run in and thus be gathered without severe shock, and then the slide valve 106 is moved to the direct build up position to supply fluid under pressure to the brake cylinder at a faster rate for providing effective braking power to decelerate the train. In the rear portion of the train, the full service application of brakes is effected at the above mentioned faster rate, through the slide valve 106 in the direct build up position, in order to obtain brakes in the rear portion of the train as rapidly as possible to aid in preventing a harsh gathering of the slack in the train.

When a gradual reduction in brake pipe pressure is effected at a service rate, the consequent gradual reduction in pressure in the emergency piston chamber 82 of the emergency valve devices 52 throughout the train, permits the quick action chamber pressure in valve chamber 83 to shift the piston 81 and auxiliary slide valve 87 upwardly to service position as defined by engagement of said piston with the spring-pressed plunger 92. In service position, a port 179 through the auxiliary slide valve 87 registers with a port 180 in the main slide valve 86, the port 180 also registering with an atmospheric passage 181, so that fluid under pressure is permitted to flow from valve chamber 83, and the connected quick action reservoir 85, to the atmosphere at substantially the same rate as the brake pipe pressure in piston chamber 82 is reduced, thereby preventing further movement of piston 81 and consequently of slide valve 86 to emergency position.

To effect a release of the brakes after a service application, the brake valve device 1 on the locomotive is operated to supply fluid under pressure to the brake pipe 22, through which fluid under pressure is supplied to the brake controlling valve devices in the train in the same manner as hereinbefore described.

In the front portion of the train, the rapid rate of increase in brake pipe pressure in piston chamber 56 of the service application valve device 51, moves the piston 55 and slide valves 59 and 60 to the inner release position, as shown in Fig. 6, and in said inner release position, valve chamber 57, auxiliary reservoir 47 and inshot reservoir 143 are recharged with fluid under pressure and the emergency reservoir 145 is connected to valve chamber 57, so that fluid under pressure is permitted to equalize in said reservoirs in the same manner as hereinbefore described.

In the inner release position of slide valve 59, fluid under pressure is vented from the brake cylinder 48 through passage 152, release choke plug 153, past check valve 154, through passage 155, cavity 156 in slide valve 59, retarded release choke 157, cavity 158, passage and pipe 159 and from thence through the retaining valve device 49.

Since diaphragm chamber 103 of the delay valve device is connected through passage 104 to cavity 162 in the service slide valve 59, which cavity is directly open to the atmosphere through the retarded release cavity 158, and since in the inner release position of said slide valve the brake cylinder is open to cavity 158 only through the restricted port 157, a relatively free flow of fluid from chamber 103 to the atmosphere is permitted by way of cavity 158 and the atmospheric exhaust port 159.

Upon venting the fluid under pressure from diaphragm chamber 103, auxiliary reservoir pressure in valve chamber 105 acting on the diaphragm 99, plus the coacting pressure of spring 177 on the spacer member 118, shifts the diaphragms 99 and 100 to their left hand position, as shown in Fig. 6.

With the diaphragms 99 and 100 positioned as above described, the rapid increase in brake pipe pressure in diaphragm chamber 101 on diaphragm 98 of the delay valve device 53, on cars at the front of the train, overcomes the auxiliary reservoir pressure in valve chamber 105 and the coacting pressure of spring 117 and deflects said diaphragm towards the left hand into engagement with the stop rib 116, it being evident that this deflection of diaphragm 98 and the consequent movement of the slide valve 106 to the delayed application position is not opposed by the diaphragms 99 and 100.

When the auxiliary reservoir pressure acting in valve chamber 57 of the service application valve device 51 becomes substantially equal to the brake pipe pressure in piston chamber 56, the inner release spring 66 shifts the piston 55 and slide valves 59 and 60 from their inner release position, as shown in Fig. 6, to the normal release position, as shown in Fig. 2. In this normal release position, the diaphragm chamber 103 is maintained vented through passage 104, cavities 162 and 158, retarded release choke 157, cavity 156 and passage 159 leading to the pressure retaining valve 49, and this permits auxiliary reservoir pressure in valve chamber 105 of the delay valve device 53 to maintain the diaphragms 99 and 100 deflected in their left hand position.

When the auxiliary reservoir pressure in valve chamber 105 in the delay valve device is increased to a degree where the coacting pressure of spring 117 slightly exceeds the difference between auxiliary reservoir and brake pipe pressures, the diaphragm 98 is deflected toward the right hand into engagement with the stop lugs 115, and since the diaphragms 99 and 100 are held in their left hand position, this deflection of diaphragm 98 and the consequent movement of stem 113 is relative to slide valve 106, which permits said slide valve to remain in the delayed application position, as shown in Fig. 2.

When the service application valve device moves from the inner release position to the normal or full release position, the auxiliary reservoir 47, emergency reservoir 145 and inshot reservoir 143 are fully charged to brake pipe pressure, as hereinbefore described.

In the rear portion of the train, the relatively slow increase in brake pipe pressure moves the service application valve piston 55 and slide valves 59 and 60 only to the full or normal release position, as shown in Fig. 2, in which position the auxiliary reservoir 47, emergency reservoir 145 and inshot reservoir 143 are charged with fluid at the pressure in the brake pipe, and fluid under pressure is vented from the brake cylinder 48 through cavity 156 in the service application valve slide valve 59, as hereinbefore described.

In the delay valve device 53, the pressure of spring 117 acting on diaphragm 98, plus the auxiliary reservoir pressure in chamber 105 acting on said diaphragm, holds said diaphragm in the right hand position, as shown in Figs. 2 and 3, so that the slide valve 106 remains in the direct build up position, as shown in Fig. 3. Fluid under pressure is vented from the diaphragm chamber 103 through passage 104, cavities 162 and 158 in the slide valve 59, retarded release choke 157 and from thence through cavity 156, with the venting of fluid from the brake cylinder 48, and it will be noted that the pressure in chamber 103 will only reduce as brake cylinder pressure reduces, so that until the brake cylinder pressure is reduced to some predetermined low degree, the diaphragms 99 and 100 in the delay valve device are held in their right hand position. This is of no consequence, however, since it is desired that the slide valve 106 remain in its right hand or direct build up position, as shown in Fig. 3. However, when the pressure in the brake cylinder 48 and in diaphragm chamber 103 acting on diaphragm 100 is reduced to a degree where the opposing pressure of spring 177, plus auxiliary reservoir pressure acting on diaphragm 99, is slightly greater, said diaphragms are deflected to their left hand position, as shown in Fig. 3.

In both the front and rear portions of the train, the emergency valve piston 81 and auxiliary slide valve 87 are moved by the increase in brake pipe pressure to their release position, as shown in Fig. 2, in which position the valve chamber 83 and quick action chamber 85 are recharged with fluid under pressure in the same manner as hereinbefore described.

It will be noted, that in effecting a release of the brakes after a service application, the slide valves 106 in the front portion of the train are returned to their delayed application position, so as to properly control a subsequent application of the brakes, while in the rear portion of the train, said slide valves remain in the direct build up position.

If it is desired to effect an emergency application of the brakes, the brake valve device 1 on the locomotive is turned to emergency position, in which fluid under pressure is suddenly vented directly from brake pipe 22 to the atmosphere through pipe and passage 21, a cavity 182 in the rotary valve 13 and through the atmospheric passage 168.

In the train, each of the service application valve devices 51 responds to the sudden emergency reduction in brake pipe pressure and operates in the same manner as when a gradual service reduction in brake pipe pressure is effected.

In addition, the sudden reduction in brake pipe pressure in the emrgency piston chamber 82 exceeds the rate at which the emergency valve device is adapted to reduce the pressure in valve chamber 83, so that the pressure in said valve chamber is permitted to move the piston 81 and thereby slide valves 86 and 87 to emergency position, which is defined by full outward traverse of said piston. In moving to emergency position, the piston 81 initially moves the auxiliary slide valve 87 relative to the main slide valve 86 and thereby opens a port 183 to the valve chamber 83, and this permits fluid under pressure from valve chamber 83 and consequently from the quick action chamber 85 to flow to a passage 184 leading to the vent valve piston chamber 133. Further movement of the emergency piston 81 to emergency position then shifts the main slide valve 86 to emergency position and opens passage 184 directly to the valve chamber 83 past the end of the slide valve 86, so that fluid under pressure continues to be supplied to the vent valve piston chamber 133.

The pressure of fluid supplied to the vent valve piston chamber 133 operates the piston 129 to unseat the vent valve 127, which permits fluid under pressure to rapidly flow from the brake pipe 22 to the atmosphere by way of passage 73, through vent valve chamber 128, past the vent valve 127 to chamber 131 and from thence to the atmosphere through passage 132. This sudden venting of fluid under pressure from the brake pipe by the operation of the vent valve device is adapted to be initiated at the brake controlling valve device first responsive to the sudden reduction in brake pipe pressure initiated by the brake valve device, and is adapted to hasten the serial propagation of emergency action from car to car through the train in the usual well known manner.

In the emergency position of the emergency slide valve 86, a cavity 185 connects passage 144 from the emergency reservoir 145 to passage 155, so that fluid under pressure from the emergency reservoir is permitted to flow to passage 155, to which passage fluid under pressure is also supplied through the service port 173 in slide valve 59 of the service application valve device 51. Thus, fluid under pressure from both the auxiliary reservoir 47 and emergency reservoir 145 is supplied to passage 155 and from thence, in the front portion of the train, through choke plug 160 to passage 152 and then to the brake cylinder 48 until movement of the slide valve 106 to the direct build up position, after which the supply of fluid from said reservoirs to the brake cylinder flows from passage 155, cavity 172 in slide valve 106, and then through passage 152, in the same manner as when a service application of the brakes is effected. In the rear portion of the train, the entire supply of fluid under pressure from the auxiliary reservoir 47 and emergency reservoir 145 to the brake cylinder 48 flows directly through cavity 172 in the slide valve 106, the same as when a service application of the brakes is effected.

It will be evident that a higher brake cylinder pressure is obtained in effecting an emergency application of the brakes than is possible in effecting a full service application of the brakes, since in emergency, fluid under pressure from the emergency reservoir is added to that from the auxiliary reservoir, whereas in service, only the auxiliary reservoir is employed as the source of fluid under pressure for applying the brakes.

Fluid under pressure supplied from the emergency valve chamber 83 and connected quick action chamber 85 to the vent valve piston chamber 133 to operate the piston 129 to unseat the vent valve 127, is exhausted through a vent port 200 in said piston to the vented chamber 134. When the pressure in chamber 133 is thus reduced to below the opposing pressure of spring 186 acting on the vent valve 127, said spring seats said vent valve, thus closing the atmospheric communication to the brake pipe 22, so that said brake pipe may be charged with fluid under pressure for effecting a release of the brakes when desired.

To effect a release of the brakes after an emergency application, the brake valve device 1 on the locomotive is operated to supply fluid under pressure to the brake pipe 22, and in the train each brake controlling valve device 44 is operated by the increase in brake pipe pressure to recharge the auxiliary reservoir 47, emergency reservoir 145, inshot reservoir 143 and quick action chamber 85, and to release fluid under pressure from the brake cylinder 48, and in the front portion of the train, to move the delay valve slide valve 106 to the delayed application position, in the manner hereinbefore described.

In controlling a train on a descending grade, it is not necessary or desirable to delay the application of brakes on cars in the front portion of the train after the initial application, since the slack in the train is gathered upon effecting the initial application.

It is customary upon descending a grade, to turn the pressure retaining valve device 49 to the cut-in or retaining position, so as to retain a certain predetermined pressure in the brake cylinder and permit the auxiliary reservoirs to be recharged without wholly releasing the brakes, so that the brake apparatus will be in condition for effecting a subsequent application of the brakes. The pressure retained in the brake cylinder 48 by operation of the retaining valve device 49, when recharging the brake equipment, also acts in chamber 103 of the delay valve device, since passage 104, leading to chamber 103, is open to the brake cylinder 48, through cavities 162 and 158, in either release position of the slide valve 59. The retained brake cylinder pressure acting in chamber 103 on the diaphragm 100 is adapted in the front portion of the train to hold said diaphragm deflected to the right hand position, as shown in Fig. 5. In this position of diaphragm 100, the shoulder 126 on the diaphragm stem 124 engages the slide valve 106 and maintains said slide valve in the direct build up position, while recharging the train, against the opposing auxiliary reservoir pressure acting on diaphragm 99, plus the difference between auxiliary reservoir and the rapidly increasing brake pipe pressure at the front of the train, acting on diaphragm 98. With the slide valve 106 thus held in the direct build up position in the front portion of the train while recharging the brake equipment on the train, it will be evident, that upon a subsequent reduction in brake pipe pressure, fluid under pressure will be supplied directly to brake cylinder 48 through passage 155, cavity 172 in said slide valve and passage 152, in the same manner as fluid under pressure is supplied to the brake cylinder in the rear portion of the train.

It will be apparent, that in normal operation and also in the initial application of brakes upon entering the descending grade, the delay valve device 53 will operate in the front portion of the train to delay the application of brakes, while upon all succeeding brake applications on the descending grade, the pressure held in the brake cylinder by the retaining valve device automatically maintains the delay valve slide valve 106 in the direct build up position, so as not to delay a subsequent application of brakes in the front portion of the train.

In operating short trains, particularly in high speed service, it is desirable to apply and release the brakes on the train as quickly as possible, and to attain this rapid application and release of brakes with the brake controlling valve devices 44, it is necessary to prevent the delay valve devices 53 in the front portion of the train from being set in the delayed application position and also to prevent the service application valve devices 51 in the front portion of the train from being moved to the inner or retarded release position.

In order to prevent the setting of the brake controlling valve devices on cars in the front portion of the train in the delayed application and retarded release position, I provide means for preventing the brake pipe pressure from being increased at such a rate as to move the service application valve device 51 to the inner release position and the delay valve device 53 to the delayed application position.

In order to regulate the rate of increase in brake pipe pressure, as just described, the cock 6 on the locomotive is turned from the open position, as shown in the drawing, to a closed position, in which latter position communication is closed from pipe 42 to pipe 43, so as to prevent fluid under pressure flowing from the feed valve device 3 directly to pipe 43, as occurs when the cock 6 is in the open position for the handling of long trains.

The pressure reservoir 7 and connected diaphragm chamber 35 of the brake pipe charging control valve device 5 being at all times open to the brake pipe 22 through the check valve device 9, the restricted portion 187 of the choke fitting 8, and pipe 21, it will be evident that said reservoir and chamber will be charged to brake pipe pressure when the brake pipe is fully charged and that fluid under pressure will flow back from said reservoir and chamber to the brake pipe and thus reduce as brake pipe pressure is reduced when effecting an application of the brakes.

Flow of fluid under pressure from the brake pipe to the pressure or control reservoir 7 and diaphragm chamber 35, upon charging the brake pipe to effect a release of the brakes, can only occur through the restricted portion 187 of the choke fitting 8.

In order to effect a release of the brakes after an application on a short train, the brake valve device 1 is initially turned to running position instead of to release position, and in running position diaphragm chamber 26 of the brake pipe charging control valve device 5 is connected to the brake pipe 22 through pipes 27 and 43, cavity 138 in rotary valve 13 of said brake valve device and passage and pipe 21. This permits the pressure in diaphragm chamber 26 to promptly reduce to brake pipe pressure, which is also acting on the opposite side of the diaphragm 32 in chamber 35. When the fluid pressures are thus substantially equalized on the diaphragm 32, spring 37 deflects said diaphragm downwardly and unseats the fluid pressure supply valve 28 against the opposing pressure of spring 31.

Upon unseating the supply valve 28, fluid supplied by the feed valve device 3 to valve chamber 23 flows past said supply valve to chamber 26 and from thence through pipes 27 and 43, cavity 138 in rotary valve 13 and passage and pipe 21 to the brake pipe 22 and also from pipe 21 through the restricted portion 187 of the choke fitting 8 to the control reservoir 7 and diaphragm chamber 35 of the brake pipe charging control valve device 5.

In supplying fluid under pressure to the brake pipe 22 in the manner just described, the pressure acting in diaphragm chamber 26 at one side of diaphragm 32 is substantially the same as the pressure in the brake pipe, while the pressure in chamber 35 and control reservoir 7 acting on the opposite side of said diaphragm is governed by the rate at which fluid under pressure is supplied from the brake pipe through the restricted portion 187 of the choke fitting 8. If the pressure tends to increase in diaphragm chamber 26 and brake pipe 22 more rapidly than the pressure is increased in the control reservoir 7 and diaphragm chamber 35, then the diaphragm 32 is deflected upwardly so as to permit the supply valve 28 to be moved toward its seat and thus reduce the rate at which fluid under pressure is supplied to the diaphragm chamber 26 and brake pipe 22. By thus controlling the rate of increase in pressure in the control reservoir 7 and diaphragm chamber 35, the supply valve 28 is automatically adjusted to supply fluid under pressure to the brake pipe in sufficient amount to increase the brake pipe pressure at the same rate as the pressure increases in the control reservoir 7 and diaphragm chamber 35.

According to the invention, the flow capacity of the restricted portion 187 of the choke fitting 8 is so related to the combined volumes of the control reservoir 7 and diaphragm chamber 35, as to permit an increase in pressure in said chamber, and thereby in the brake pipe 22, by operation of the brake pipe charging control valve device 5, such that in the train, the rate of increase in brake pipe pressure will not be sufficient to move the piston 55 and slide valves 59 and 60 of the service application valve device 51 to the inner release position, so as to restrict the release of fluid under pressure from the brake cylinder. Further, this rate of increase in brake pipe pressure is such that spring 117 in the delay valve device 53 prevents deflection of diaphragm 98 toward the left hand. Thus, the slide valve 106 remains in the direct build up position, so that upon a subsequent reduction in brake pipe pressure the application of brakes at the head end of the train will not be delayed, as occurs in the front portion of a long train.

The control reservoir 7 is provided merely to increase the volume of diaphragm chamber 35 of the brake pipe charging control valve device 5, and the pressure of spring 37 on diaphragm 32 is such, that when said device is operating to supply fluid under pressure to the brake pipe, the pressure of fluid in the brake pipe will be maintained substantially equal to the pressure of fluid in control reservoir 7 and diaphragm chamber 32.

It will now be noted that valve means are provided to operate in the front portion of the train to initially delay or retard the application of the brakes until a predetermined pressure is obtained in the brake cylinder and then to supply fluid under pressure to the brake cylinder at a faster rate, said valve means being operative in the rear portion of the train to supply fluid under pressure to the brake cylinder only at said faster rate. The valve means just referred to, are automatically positioned or adjusted according to their location in a train when effecting a release of the brakes. For facilitating the control of short trains, means are provided on the locomotive to so regulate the charging of the brake pipe, that the above referred to valve means in the train are adjusted throughout the train to supply fluid under pressure to the brake cylinder only at the faster rate, upon effecting an application of the brakes and also the service application valve device is prevented from moving to the retarded release position so that the release of brakes will not be delayed.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake system, the combination with a brake pipe, a brake cylinder and a valve device operative upon a reduction in brake pipe pressure to supply fluid under pressure to said brake cylinder and operative upon an increase in brake pipe pressure to vent fluid under pressure from said brake cylinder, valve means controlling communication through which said valve device supplies fluid to the brake cylinder and movable by brake pipe pressure, when the increase in brake pipe pressure exceeds a predetermined rate, to a position in which fluid under pressure is adapted to be supplied to the brake cylinder at a restricted rate, a feed valve device for at one time supplying fluid under pressure to said brake pipe, and additional valve means for supplying fluid under pressure to the brake pipe at a rate less than said predetermined rate at another time.

2. In a fluid pressure brake system, the combination with a brake pipe, of a brake cylinder and a valve device on a car of the train, said valve device being operative upon a reduction in brake pipe pressure to supply fluid under pressure to said brake cylinder and operative upon an increase in brake pipe pressure to vent fluid under pressure from said brake cylinder, valve means on the car controlling communication through which said valve device supplies fluid to the brake cylinder and movable by brake pipe pressure, when the increase in brake pipe pressure exceeds a predetermined rate, to a position in which fluid under pressure is adapted to be supplied to the brake cylinder at a restricted rate, a brake valve device on the locomotive of the train for supplying fluid under pressure to said brake pipe, means for positively limiting the rate at which fluid is supplied to the brake pipe by said brake valve device to a rate less than said predetermined rate, a feed valve device for controlling the supply of fluid under pressure to said brake pipe by the operation of said brake valve device and a manually operated valve movable to a position for rendering either said means or said feed valve device effective and the other ineffective.

3. In a fluid pressure brake system, the combination with a brake pipe, a brake cylinder and a valve device on a car of the train, said valve device being movable to an application position upon a reduction in brake pipe pressure to supply fluid under pressure to said brake cylinder, and being movable, upon an increase in brake pipe pressure, either to a normal release position or an inner release position, according to the rate of increase in brake pipe pressure, for releasing fluid under pressure from said brake cylinder, of valve means on said car through which said valve device supplies fluid under pressure to said brake cylinder and movable by brake pipe pressure, when the increase in brake pipe pressure corresponds with that required to move said valve device to said inner position, to a position in which the supply of fluid under pressure from said valve device to said brake cylinder is adapted to be retarded, a feed valve device on the locomotive for at one time supplying fluid under pressure to said brake pipe, and additional valve means on the locomotive operative at another time to supply fluid under pressure to said brake pipe at a rate less than the rate required to move said valve device to said inner position.

4. In a fluid pressure brake system, the combination with a brake pipe, a brake cylinder and a valve device on a car of the train, said valve device being movable to an application position upon a reduction in brake pipe pressure to supply fluid under pressure to said brake cylinder, and being movable, upon an increase in brake pipe pressure, either to a normal release position or an inner release position, according to the rate of increase in brake pipe pressure, for releasing fluid under pressure from said brake cylinder, of valve means on said car through which said valve device supplies fluid under pressure to said brake cylinder and movable by brake pipe pressure, when the increase in brake pipe pressure corresponds with that required to move said valve device to said inner position, to a position in which the supply of fluid under pressure from said valve device to said brake cylinder is adapted to be retarded, valve means on the locomotive for supplying fluid under pressure to said brake pipe, and means for positively limiting the rate at which fluid is supplied by the last mentioned valve means to the brake pipe to a rate less than the rate required to move said valve device to said inner position, said means comprising a movable abutment subject to the opposing pressures of the brake pipe and a control chamber, a valve operated by said abutment to supply fluid under pressure to said brake pipe, and means for supplying fluid under pressure to said control chamber at the last mentioned rate.

5. In a fluid pressure brake system, the combination with a brake pipe, a brake cylinder and a valve device on a car of the train, said valve device being movable to an application position upon a reduction in brake pipe pressure to supply fluid under pressure to said brake cylinder, and being movable, upon an increase in brake pipe pressure, either to a normal release position or an inner release position, according to the rate of increase in brake pipe pressure, for releasing fluid under pressure from said brake cylinder, of valve means on said car through which said valve device supplies fluid under pressure to said brake cylinder and movable by brake pipe pressure, when the increase in brake pipe pressure corresponds with that required to move said valve device to said inner position, to a position in which the supply of fluid under pressure from said valve device to said brake cylinder is adapted to be retarded, valve means on the locomotive for supplying fluid under pressure to said brake pipe, and means for positively limiting the rate at which fluid is supplied by the last mentioned valve means to the brake pipe to a rate less than the rate required to move said valve device to said inner position, said means comprising a spring, a movable abutment subject on one face to brake pipe pressure and on the opposite face to the pressure of said spring plus the pressure of fluid in a control chamber in constant communication with said brake pipe, a valve operative by said abutment to supply fluid under pressure to said brake pipe, a choke fitting through which fluid under pressure is supplied from said brake pipe to said control chamber, said choke fitting having a restricted portion to limit the increase in pressure in said chamber to the last mentioned rate, and an unrestricted one way flow communication connecting said chamber to said brake pipe.

6. In a fluid pressure brake system, the combination with a brake pipe, a brake cylinder and a valve device on a car of the train, said valve device being movable to an application position upon a reduction in brake pipe pressure to supply fluid under pressure to said brake cylinder, and being movable, upon an increase in brake pipe pressure, either to a normal release position or an inner release position, according to the rate of increase in brake pipe pressure, for releasing fluid under pressure from said brake cylinder, of valve means on said car through which said valve device supplies fluid under pressure to said brake cylinder and movable by brake pipe pressure, when the increase in brake pipe pressure corresponds with that required to move said valve device to said inner position, to a position in which the supply of fluid under pressure from said valve device to said brake cylinder is adapted to be retarded, a brake valve device on the locomotive having a running position for supplying fluid under pressure to said brake pipe, and an application position for venting fluid under pressure from said brake pipe, a feed valve for supplying fluid under pressure to said brake valve device and operative to regulate the pressure of fluid supplied to said brake pipe by operation of said brake valve device, a manually operated cut-out valve having a position for closing communication from said feed valve device to said brake valve device, and means operative when said cut-out valve is in said position to supply fluid under pressure around said cut-out valve to said brake valve device at a rate less than required to move said valve device to said inner position, the last mentioned means comprising a casing having a chamber at all times supplied with fluid under pressure from said feed valve, a supply valve contained in said chamber and operative to supply fluid under pressure from said chamber to said brake valve device, a spring, a movable abutment subject on one face to the pressure of fluid supplied past said supply valve to said brake valve device, and subject on the opposite face to the pressure of said spring plus the pressure of fluid in a control chamber connected through a one way flow communication to said brake pipe, and a choke fitting in another communication connecting the brake pipe to said chamber, said choke fitting having a restricted portion for regulating the rate of flow of fluid under pressure from said brake pipe to said control chamber to the last mentioned rate.

7. In a fluid pressure brake, the combination with a brake pipe, of means on the locomotive for controlling the supply of fluid under pressure to the brake pipe comprising a valve for supplying fluid under pressure to the brake pipe, and a movable abutment, for operating said valve, which is subject to the opposing pressures of the brake pipe and a chamber which is supplied with fluid from the brake pipe at a restricted rate.

8. In a fluid pressure brake, the combination with a brake pipe, of a feed valve device for supplying fluid under pressure at a predetermined rate, and means for controlling the supply of fluid from said feed valve device to said brake pipe comprising a valve for supplying fluid under pressure to said brake pipe, and a movable abutment for operating said valve, said abutment being subject to the opposing pressures of the brake pipe and a chamber which is supplied with fluid from the brake pipe at a restricted rate.

9. In a fluid pressure brake, the combination with a brake pipe, of a feed valve device for supplying fluid under pressure at a predetermined rate, means for controlling the supply of fluid from said feed valve device to said brake pipe comprising a valve for supplying fluid under pressure to said brake pipe, and a movable abutment for operating said valve, said abutment being subject to the opposing pressures of the brake pipe and a chamber which is supplied with fluid from the brake pipe at a restricted rate, and a manually operable valve having a position in which fluid from said feed valve device is supplied directly to said brake pipe.

10. In a fluid pressure brake system, the combination with a brake pipe, a feed valve device, and a brake valve device having a running position in which communication is established for supplying fluid under pressure from said feed valve device to the brake pipe, an auxiliary device for supplying fluid under pressure to the brake pipe at a restricted rate, and means operative to close said communication, said auxiliary device being operative to supply fluid under pressure to the brake pipe, upon closure of said communication.

11. In a fluid pressure brake system, the combination with a brake pipe, a feed valve device, and a brake valve device having a running position in which communication is established for supplying fluid under pressure from said feed valve device to the brake pipe at a restricted rate, an auxiliary device for supplying fluid under pressure to the brake pipe at a rate less than said restricted rate, and manually operable means for cutting off said communication, said auxiliary device being operative upon closure of said communication to supply fluid under pressure to the brake pipe.

12. In a fluid pressure brake system, the combination with a brake pipe, a feed valve device, and a brake valve device having a running position in which communication is established for supplying fluid under pressure from said feed valve device to the brake pipe, an auxiliary device for supplying fluid under pressure to the brake pipe, means for controlling the rate at which fluid under pressure is supplied to the brake pipe by the operation of said auxiliary device, and means operative to close said communication, said auxiliary device being operative to supply fluid under pressure to the brake pipe upon closure of said communication.

13. In a fluid pressure brake system, the combination with a brake pipe, a feed valve device, and a brake valve device having a running position in which communication is established for supplying fluid under pressure from said feed valve device to the brake pipe, means operative to close said communication, and an auxiliary valve device operative upon closure of said communication to supply fluid under pressure to said brake pipe, said auxiliary valve device comprising a valve operative to supply fluid under pressure to said brake pipe, and a movable abutment controlled by the pressure of fluid supplied by said valve acting in opposition to a pressure substantially equal to that in said brake pipe for controlling said valve.

14. In a fluid pressure brake system, the combination with a brake pipe, a feed valve device, and a brake valve device having a running position in which communication is established for supplying fluid under pressure from said feed valve device to the brake pipe, means operative to close said communication, and an auxiliary valve device operative upon closure of said communication to supply fluid under pressure to said brake pipe, said auxiliary valve device comprising a valve operative to supply fluid under pressure to said brake pipe, a movable abutment controlled by the pressure of fluid supplied by said valve acting in opposition to a pressure in a chamber for controlling said valve, and means including a choke for supplying fluid under pressure to said chamber at a chosen rate.

15. In a fluid pressure brake system, the combination with a brake pipe, a feed valve device, and a brake valve device having a running position in which communication is established for supplying fluid under pressure from said feed valve device to the brake pipe, means operative to close said communication, and an auxiliary valve device operative upon closure of said communication to supply fluid under pressure to said brake pipe, said auxiliary valve device comprising a valve operative to supply fluid under pressure to said brake pipe, a movable abutment controlled by the pressure of fluid supplied by said valve acting in opposition to a pressure in a chamber for controlling said valve, and means including a choke for supplying fluid under pressure from said brake pipe to said chamber at a chosen rate.

16. In a fluid pressure brake system, the combination with a brake pipe, of a valve operative to supply fluid under pressure to said brake pipe at a rate dependent upon the degree of movement of said valve, a movable abutment for operating said valve and controlled by the pressure of fluid in a chamber acting in opposition to a pressure substantially equal to that in said brake pipe, means including a choke for supplying fluid under pressure to said chamber at a chosen rate, a brake valve device operative in one position to establish a communication through which fluid under pressure is adapted to be supplied to said brake pipe by the operation of said valve, and operative in another position to close said communication and to vent fluid under pressure from said brake pipe, and means for releasing fluid under pressure from said chamber as fluid under pressure is vented from said brake pipe.

17. In a fluid pressure brake system, the combination with a brake pipe, of a feed valve device operative to supply fluid under pressure to said brake pipe at one rate, valve means operative to supply fluid under pressure to said brake pipe at another rate, a brake valve device having a running position for establishing a communication through which fluid under pressure is supplied to said brake pipe by the operation of said feed valve device and valve means, and means for rendering said feed valve ineffective to supply fluid under pressure to said communication.

18. In a fluid pressure brake system, the combination with a brake pipe and a brake valve device having a running position for establishing a communication through which fluid under pressure is adapted to be supplied to said brake pipe, a feed valve device operative to supply fluid under pressure to said communication, a valve device for controlling the supply of fluid under pressure from said feed valve device to said communication and operative to cut off said supply, valve means operative according to a chosen rate of increase in pressure in a chamber, upon the operation of said valve device to cut off said supply, to control the flow of fluid under pressure from said feed valve device to said communication, and means for controlling the rate of increase in pressure in said chamber.

19. In a fluid pressure brake system, the combination with a brake pipe and a brake valve device having a running position for establishing a communication through which fluid under pressure is adapted to be supplied to said brake pipe, a feed valve device operative to supply fluid under pressure to said communication, a valve device for controlling the supply of fluid under pressure from said feed valve device to said communication and operative to cut off said supply, valve means operative according to a chosen rate of increase in pressure in a chamber, upon the operation of said valve device to cut off said supply, to control the flow of fluid under pressure from said feed valve device to said communication, means for controlling the rate of increase in pressure in said chamber, said brake valve device having a position for effecting a reduction in brake pipe pressure, and means for reducing the pressure in said chamber according to the reduction in brake pipe pressure effected by the operation of said brake valve device.

20. In a locomotive brake equipment, the combination with a brake pipe, of valve means controlled by a chosen rate of increase in pressure for supplying fluid under pressure to said brake pipe at a corresponding rate, a feed valve device for limiting the degree of pressure obtained in said brake pipe by the operation of said valve means, and means for limiting said chosen rate to a degree less than the capacity of said feed valve device.

21. In a locomotive brake equipment, the combination with a brake pipe, of valve means operative according to the rate of increase in pressure in a chamber for supplying fluid under pressure to said brake pipe at a corresponding rate, and means adapted to limit the rate of increase in pressure in said chamber and thereby in said brake pipe to such a degree relative to the rate at which fluid under pressure may flow to the auxiliary reservoir through a brake controlling valve device, of the type having a normal release position and an inner release position, as to avoid moving the brake controlling valve devices in a train to the inner release position.

22. In a locomotive brake equipment, the combination with a brake pipe, of valve means operative according to the rate of increase in pressure in a chamber for supplying fluid under pressure to said brake pipe, and means including a choke for supplying fluid under pressure from said brake pipe to said chamber at a chosen rate.

ELLIS E. HEWITT.